United States Patent [19]

Cadwell

[11] Patent Number: 5,002,219
[45] Date of Patent: Mar. 26, 1991

[54] METHOD AND APPARATUS FOR CLAMPING LARGE ASSEMBLIES FOR DIFFUSION BONDING AND SUPERPLASTIC FORMING

[75] Inventor: Gilbert C. Cadwell, Lakeside, Calif.

[73] Assignee: The United States of America as represented by the Secretary of the Navy, Washington, D.C.

[21] Appl. No.: 548,855

[22] Filed: Jul. 6, 1990

[51] Int. Cl.⁵ .......................................... B23K 20/00
[52] U.S. Cl. ................................... 228/155; 228/157; 228/213; 228/44.3
[58] Field of Search ............... 228/155, 157, 190, 213, 228/237, 44.3, 47

[56] References Cited

U.S. PATENT DOCUMENTS

| | | | |
|---|---|---|---|
| 3,737,978 | 6/1973 | Rathbun | 228/213 |
| 4,426,032 | 1/1984 | Leodolter | 228/157 |
| 4,429,824 | 2/1984 | Woodward | 228/157 |
| 4,691,857 | 9/1987 | Friedman | 228/190 |
| 4,889,276 | 12/1989 | Cadwell et al. | 228/237 |

Primary Examiner—Sam Heinrich
Attorney, Agent, or Firm—Harvey Fendelman; Thomas G. Keough; Peter A. Lipovsky

[57] ABSTRACT

A clamping method and apparatus for applying the necessary pressure to an assembly of metal parts during diffusion bonding and/or superplastic forming of the parts. Basically, the apparatus comprises a pair of opposed generally L-shaped frames having a cavity therebetween for holding the assembly of parts and associated shaping tooling. The frames are pivotable about a hinge connecting first ends, with a mechanism at the opposite ends for moving the frames together in a clamping manner or apart to allow access to the cavity. The tooling within the cavity typically includes a pressure vessel having a housing containing ceramic forming members having an internal volume within which metal parts to be shaped and/or bonded are placed. The parts are subjected to heat and pressure during processing. This apparatus and method are particularly suitable for manufacturing elongated metal products having a generally box-like cross section.

20 Claims, 4 Drawing Sheets

METHOD AND APPARATUS FOR CLAMPING LARGE ASSEMBLIES FOR DIFFUSION BONDING AND SUPERPLASTIC FORMING

BACKGROUND OF THE INVENTION

This invention involves the shaping and bonding of metal assemblies by pressing at high temperatures. More specifically, this invention relates to an improved clamp assembly for applying the necessary pressure during such operations.

Hot isostatic pressing, as exemplified by U.S. Pat. No. 3,739,617 to Stejskal, basically involves preparing an assembly of metal parts, powdered metal, etc., on a forming surface, covering the assembly with a flexible blanket or deformable bag and placing the assembly in an autoclave at high temperature and pressure to form and bond the assembly.

This is a very effective manufacturing technique for a variety of materials and assemblies. However, this method is difficult to use with parts that cannot be pressed with a simple bag and is often wasteful of energy where a large autoclave must be heated to press a small volume of assemblies. Complex, flexible, sheet metal housing have been designed for forming and bonding complex shapes by hot isostatic pressing. Typical are those described by Borchert et al in U.S. Pat. No. 4,575,327. These housing and the pressure transmitting components are expensive and difficult to design for proper assembly and disassembly without interference either before and after pressing.

Attempts have been made to use granular materials, such as is shown by Rigby et al in U.S. Pat. No. 4,552,710 or molten glass (Schilling et al, U.S. Pat. No. 4,183,456) as the pressure transmitting medium for complex shapes. Pressure is often not entirely isostatic and removing the material after pressing is often difficult and the material may adversely react with the assembly materials when brought into contact with them at high temperatures.

Expandable bags, as shown, for example by Schwarzkopf in U.S. Pat. No. 3,922,127, and materials with a high coefficient of thermal expansion as taught by Horn et al, U.S. Pat. No. 3,795,559, have been used to apply pressure to complex areas of an assembly. These techniques have been generally limited to low melting metals and low temperature fabrication of fiber reinforced synthetic resin matrix materials.

Very large presses and autoclaves have been required for the production of very long products having a hollow or approximately box-like cross section by these prior methods.

Therefore, there continues to exist an unmet need for simpler and less expensive methods and apparatus for forming and/or bonding metal parts at high temperatures, in particular for very long hollow parts.

SUMMARY OF THE INVENTION

The above-noted problems, and others are overcome by the method and apparatus of this invention which basically comprises a pair of opposed frame members having a cavity therebetween adapted to hold a pressure vessel containing parts to be superplastic formed or diffusion bonding and related shaping components. The frames are secured together by hinge means along one contacting edge, allowing the frames to be brought together in a closed or clamping configuration surrounding and clamping the pressure vessel therebetween and to be pivoted apart to allow the pressure vessel to be removed. Drive means is provided to move the frames between these positions. Lock means is provided to lock the frames in the closed position during the forming/bonding operation, relieving the drive means from the necessity of holding the frames together during long periods.

While the pair of cooperating frames may be arranged in any suitable orientation, a vertical orientation with the hinge means at the bottom and the openable edge at the top is preferred to allow easy insertion and removal of the often large and heavy pressure vessel from the cavity with conventional cranes or other lifting devices.

Any suitable pressure vessel may be placed in the inter-face cavity. For superplastic forming, the pressure vessel may typically comprise a thin metal housing containing cast ceramic shaping components having openings in which the parts to be shaped, typically metal sheet part blanks, are placed. Heating elements are embedded in the ceramic components and generally a cooling water jacket surrounds the ceramic components to reduce heat transfer to the clamp assembly and the environment. One or more tubes are provided through the pressure vessel into the internal volumes between adjacent clamp assemblies. The internal volume is purged of air with an inert gas such as argon. During heating, an inert gas under pressure is introduced between the blanks to force them against the ceramic shaping surfaces. Upon completion of forming, the assembly is cooled, the frames are pivoted to the open position, the pressure vessel is lifted out and the formed parts are removed from the pressure vessel.

Diffusion bonding is accomplished in much the same manner, the primary difference being that parts are placed in contact on the ceramic shaping surface and a pressure diaphragm is placed adjacent to the parts. The internal volumes are purged of air by a vacuum evacuation or flushing with an inert gas such as argon. When gas pressure is introduced while the vessel is heated, the diaphragm is forced against the parts while diffusion bonding takes place between the parts. As is apparent, both superplastic forming of blanks and diffusion bonding to other parts could take place simultaneously.

While a variety of large parts can be easily and economically manufactured using the tooling described above, this arrangement is particularly adapted to the manufacturing of very long articles, which may have hollow, U-shaped or box-like cross sections. The length of the pressure vessel cavity between opposed clamping frames is almost unlimited, far beyond the capacity of conventional presses or autoclaves.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
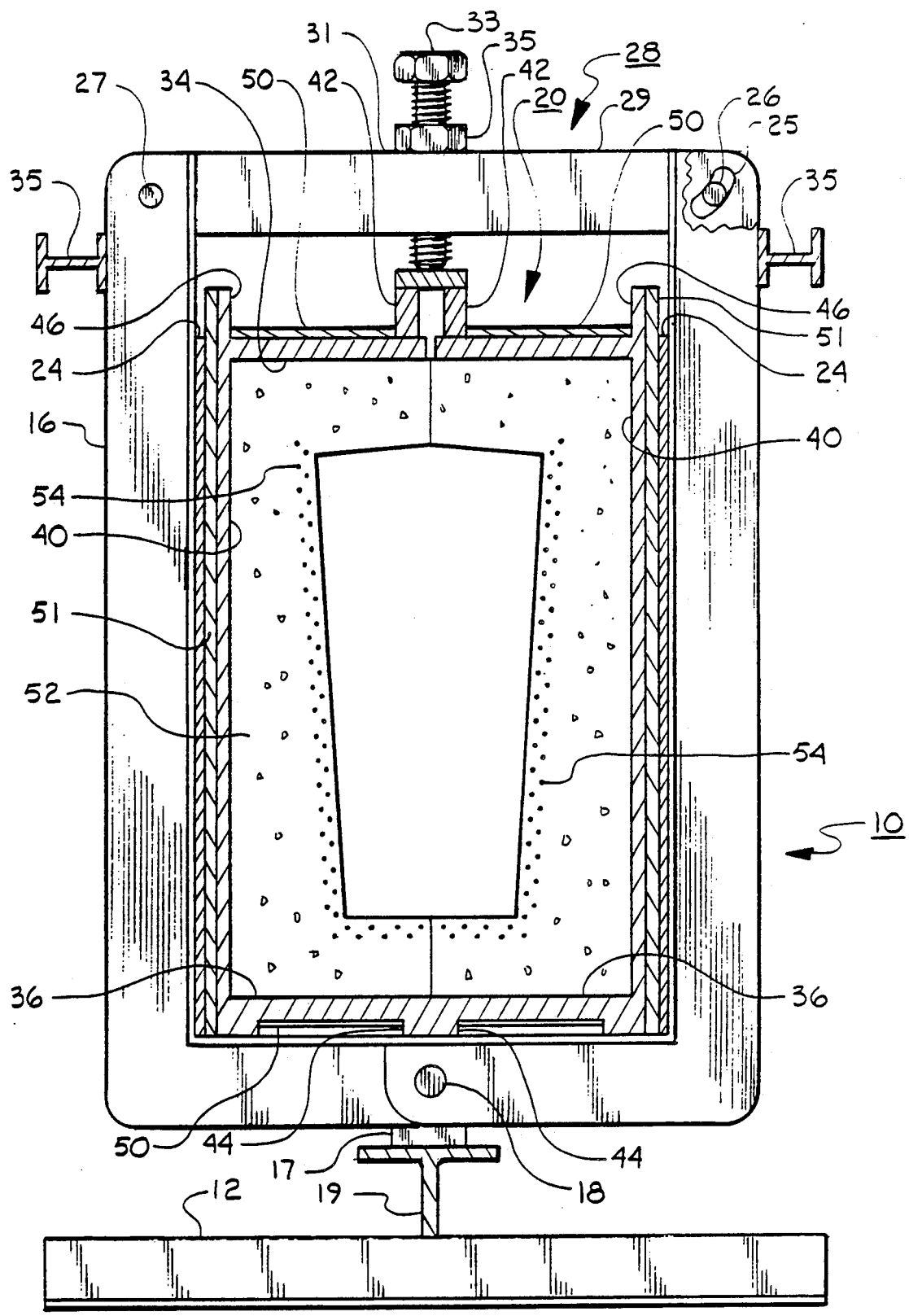
FIG. 1 is a vertical transverse section view through the clamping apparatus in the closed position.

Referring now to FIG. 1, there is seen a schematic vertical section view through the apparatus 10 of this invention. FIG. 2 shows a side view of a portion of the apparatus. The apparatus may have any suitable length, in the direction perpendicular to the plane of FIG. 1. This invention is particularly adapted to the production of very long parts having a hollow, U-shaped, box shaped, etc. cross section.

The apparatus is mounted on feet 12. Each of a plurality of spaced pairs of clamp frames 14 and 16 are pivotably mounted along base member 19 through pin 18.

Figure 2A:
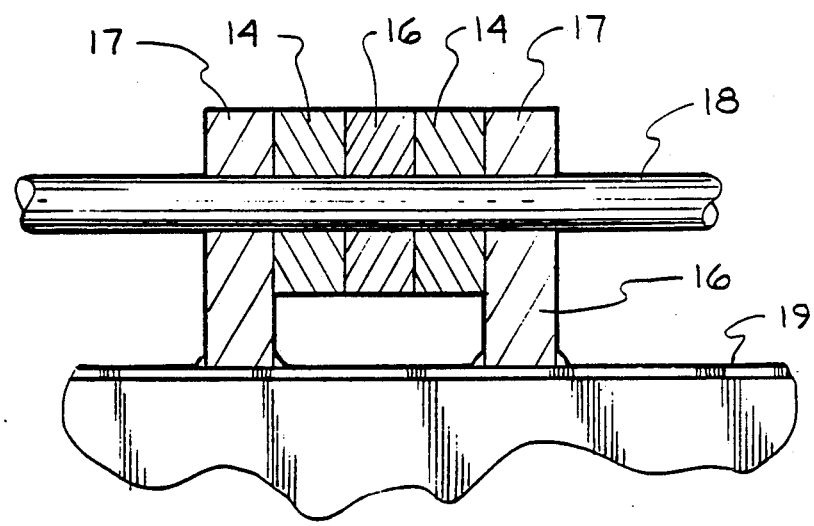
FIG. 2a is a detail section view through the clamp pivot assembly, taken on line 2a—2a in FIG. 1.
Figure 2B:
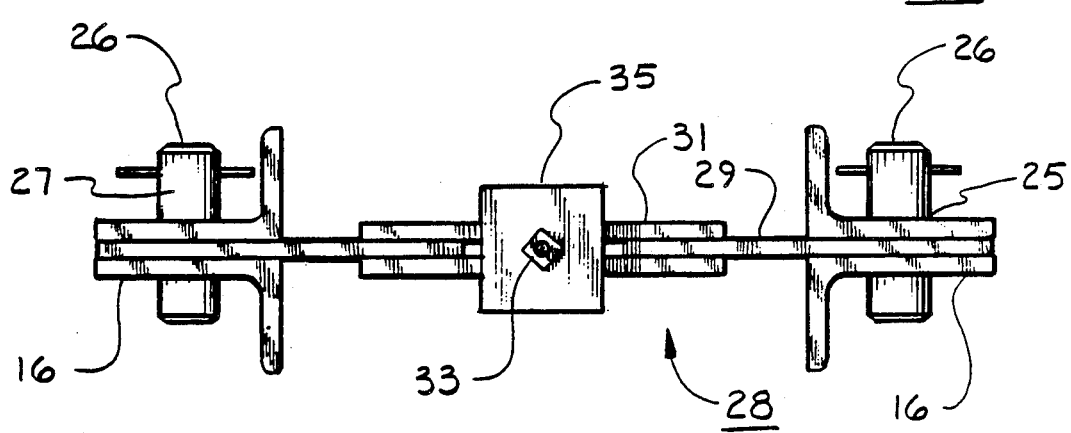
FIG. 2b is a detail plan view of the upper clamp assembly portion of the clamping apparatus shown in FIG. 1.

As seen in detail in FIG. 2a, the pivot assembly includes a pair of upstanding brackets 17 secured (such as by welding) to a strongback member 19, here an I-beam 16, extending the length of the apparatus and attached to feed 12 for stability. The end of one clamp frame 14 is bifurcated as indicated and surrounds the single end of the other clamp frame 16. An elongated rod or pin 18 extends through the assembly allowing pivoting movement of frames 14 and 16.

As is detailed below, clamp frames 14 and 16 surround and support an elongated pressure vessel 20. Between clamp frames 14 and 16, pressure vessel 20 is supported by the lower inside edges of frames 14 and 16. Support for the sides of pressure vessel 20 is provided by plates 24 which are secured, such as by welding, to clamp frames 14.

Figure 3:
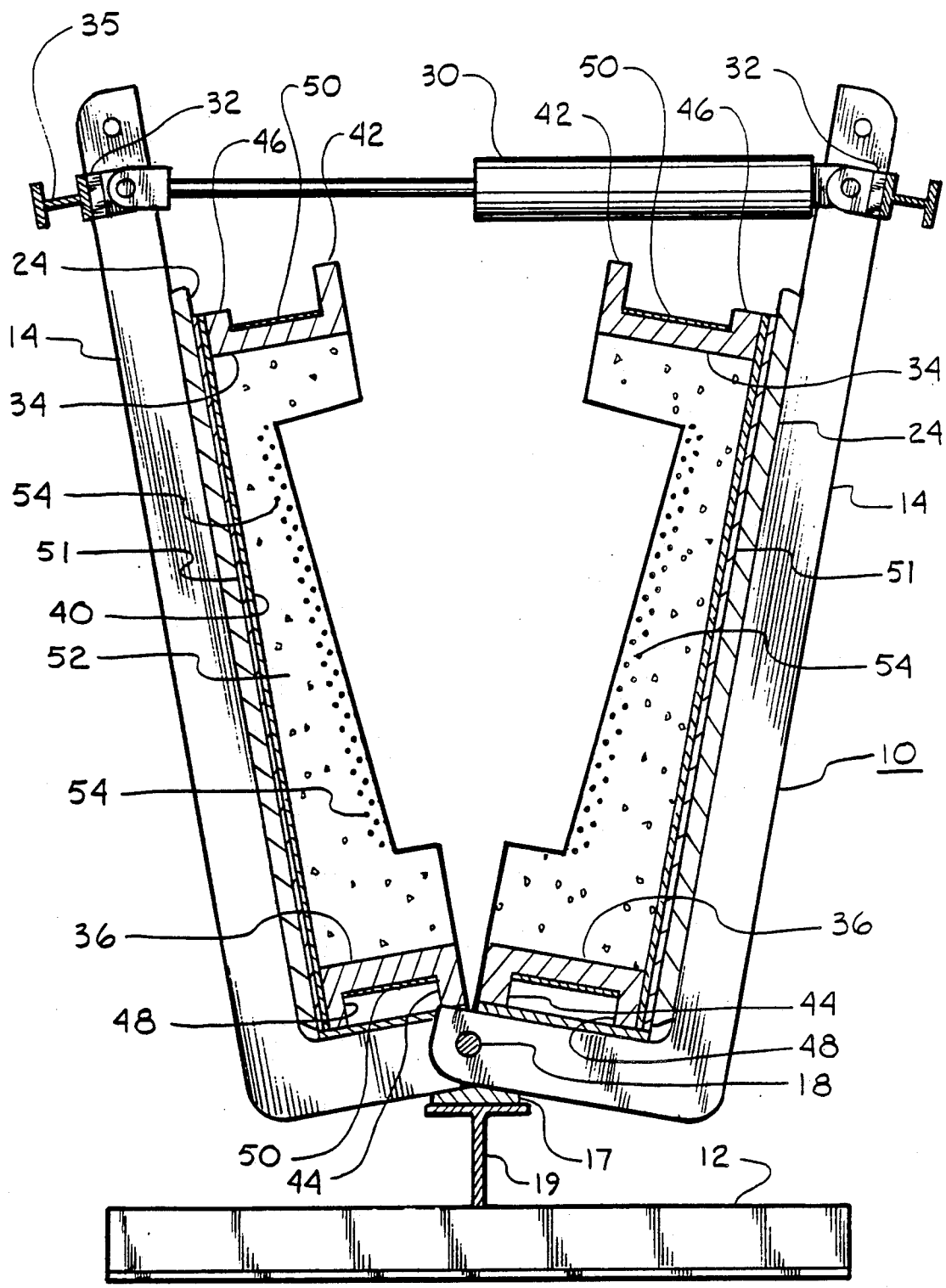
FIG. 3 is a schematic side vertical transverse section view showing the clamping apparatus in the open position.

Clamp frames 14 are pairs of L-shaped overlapping frames pivotable about pivot pin 18 from the closed or clamped position shown in FIG. 1 to the open position shown in FIG. 3. When in the closed position of FIG. 1, locking pins 26 may be inserted in holes 27 and 25 passing through the overlapped ends of frames 14 and 16 engaging the ends of bar 28 as seen in FIG. 1 and 26.

Bar 28 is a weldment of two end pieces 29 and overlapping center plates 31, providing an opening between plates 31 through which a screw 33 extends. Screw 33 is threaded through a plate 35 welded to plates 31. The end of screw 33 bears against the upper surface of pressure vessel 20. As seen in FIG. 1, the upper edge of frame 14 is cut-away to show that hole 25 is an elongated slot angled so that as screw 33 is driven against pressure vessel 20, pin 26 bears against slot 25 so as to drive frame 16 inwardly to clamp tightly against pressure vessel 20.

The clamp frames 14 are opened to the position shown in FIG. 3 by removing pin 26 and actuating the hydraulic cylinder 30 seen in FIG. 3 (not shown in FIG. 1, for clarity). Hydraulic cylinder 30 is mounted by brackets 32 onto elongated reinforcing I-beams 35 at the ends of the assembly which may be secured to all of the clamp frames 14 along one side of the assembly to assure alignment and reinforce the overall assembly. Any other suitable actuator may be used, if desired. In the open position side plates 24 are moved away from pressure vessel 20, allowing easy and convenient removal of the vessel with a crane or the like.

Sideplates 24 may be attached to the sidewalls of pressure vessel 20, if desired. When frames 14 and 16 are opened, the halves of pressure vessel 20 move with sideplates 24, opening pressure vessel 20, allowing easy removal of the formed part. The pressure vessel halves may be removed and replaced separately. Alternatively, the pressure vessel could be fastened closed, so that it would be lifted out as a unit with the formed parts.

Details of pressure vessel 20 are apparent in FIGS. 1 and 3. Vessel 20 has a sturdy pair of top plates 34 and a similar pair of bottom plates 36, divided along their approximate centerline to allow separation for access to the internal volume 38. Thin sidewalls 40 (which are supported by side plates 24) are secured, such as by welding, to plates 34 and 36. Upstanding elongated ribs 42 may be provided on top plates 34 and ribs 44 on bottom plates 36. Also, bolts may be passed through these ribs, if desired, to allow easy handling of vessel 20 during insertion and removal from the clamping assembly. Elongated outer ribs 46 and 48 are secured to top and bottom plates 34 and 36, respectively, as a reinforcement and to form a channel between the spaced ribs into which thin walled cooling fluid jackets 50 can be placed. Additional cooling fluid jackets 51 may be provided along the sides of vessel 20. Typically, these cooling jackets could lie in grooves in plate 24 and sidewalls 40, in tubes or grooves in the outer areas of body 52, or in any other suitable location.

A mass of suitable mold forming material, such as cast ceramic body 52, is placed with vessel 20. Generally, body 52 is divided along its centerline to provide access to interior volume 38. A plurality of heating elements 54 are embedded within body 52 adjacent to interior volume 38. In most cases, metal sheets or blanks and other parts are placed in volume 38 and pressure is produced on those blanks and parts during heating to cause them to deform and bond together. Preferably, fluid pressure is introduced, such as through a conduit to pressurize interior volume 38. While gas pressure is preferred, liquids could be used, or solid or granular material having selected high coefficients of thermal expansion can be used to provide the required pressure during heating.

Figure 4:
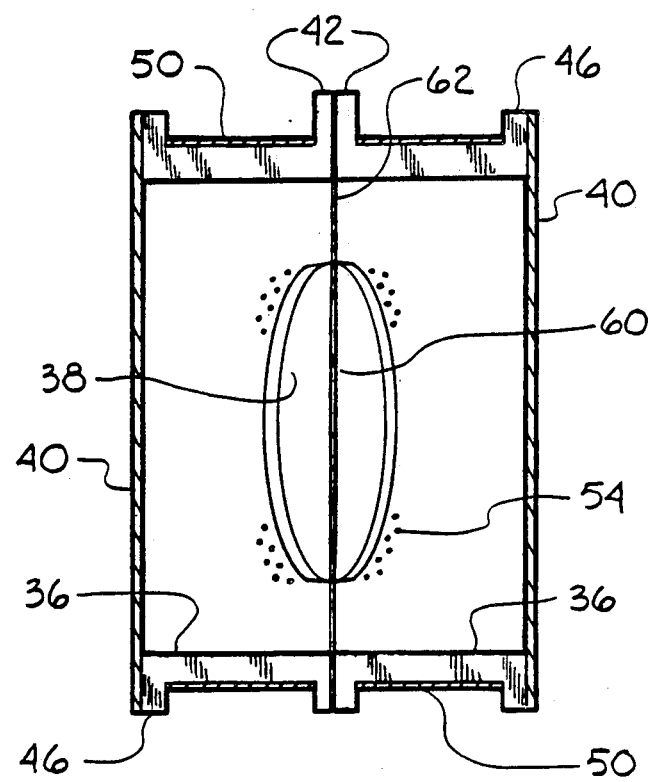
FIG. 4 is a detail vertical transverse section view showing a pressure vessel configured for superplastic forming.

A typical pressure vessel for use in superplastic forming is schematically illustrated in FIG. 4. Here the interior of body 52 has a concave surface. A pair of sheet blanks 60 (welded around their periphery) are secured across the center of the interior volume 38. A pressurizing gas is admitted through a tube 62 extending along cooperating grooves in each half of body 52, ending between blanks 60. After pressure vessel 20 is placed in the clamping apparatus 10, the apparatus is heated to the desired temperature, the pressure vessel is opened and part blanks 60 are placed in the cavity and pressurized gas is introduced through tube 62 to superplastic deform blanks 60 against the interior walls of volume 38, forming a shaped part. Lock pin 26 is removed and hydraulic cylinder 30 is operated to open the apparatus, allowing removal of vessel 20, from which the product can then be removed.

Figure 5:
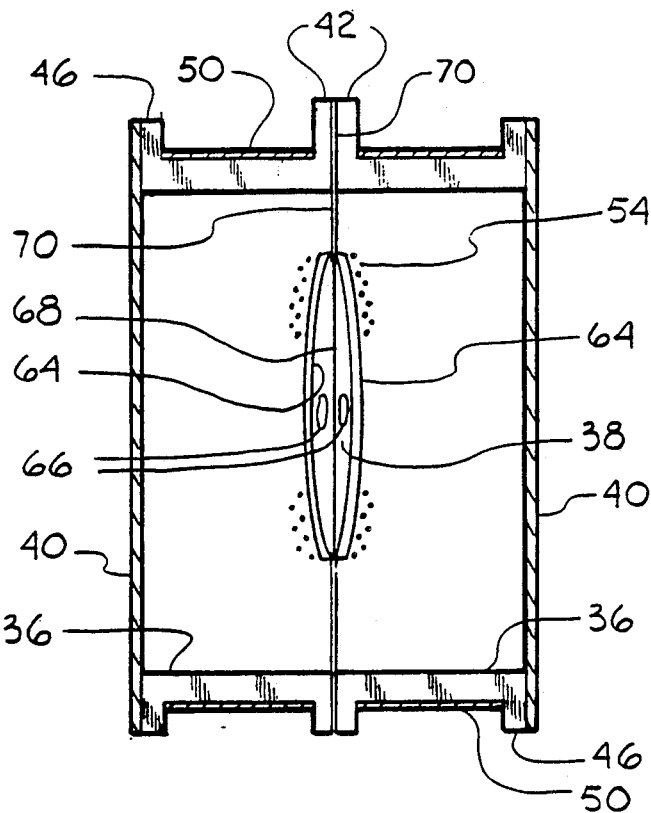
FIG. 5 is a detail vertical transverse section view showing a pressure vessel configured for diffusion bonding.

The use of apparatus 10 in the production of diffusion bonded products is illustrated in FIG. 5. The apparatus and operation are basically as described in conjunction with FIG. 4, above. Here, flat or preformed sheet parts 64 are placed against the interior walls of volume 38, other small parts 66 to be diffusion bonded to parts 64 are placed at the desired locations and held in place by tack welds or the like. A double walled pressure diaphragm 68 is placed across the interior volume 38, then when heating is at the proper point, high pressure gas is introduced through tube 70 to expand diaphragm 68 and press the parts together until diffusion bonding occurs. The parts are then removed as described above.

While certain preferred components, conditions and configurations have been detailed in conjunction with the above description of preferred embodiments, those may be changed, where suitable, with similar results. Other variations, applications and ramifications of this invention will occur to those skilled in the art upon reading this disclosure. Those are intended to be included within the scope of this invention, as defined in the appended claims.

I claim:

1. An apparatus for clamping a bonding and forming assembly which comprises:
   at least one pair of opposed generally L-shaped frames;
   hinge means connecting first ends of said frames to form generally U-shaped assemblies with the second frame ends movable toward and away from each other;
   actuator means for moving said second ends toward each other to a closed position defining a cavity adapted to receive a pressure vessel and away from each other to an open position;
   bar means for connecting said second ends in said closed position and for releasing said ends to permit movement to said open position; and
   means for driving said second ends together while in said closed position to clamp a pressure vessel in said cavity.

2. The apparatus according to claim 1 wherein a plurality of pairs of said pairs of frames are arranged in series with said second ends interconnected to move together, whereby an elongated pressure vessel may be clamped.

3. The apparatus according to claim 1 wherein said bar means is connected to said second ends by pins which extend through aligned holes in said second ends and the ends of said bar means.

4. The apparatus according to claim 3 wherein said means for driving said second ends together comprises a screw means having a screw extending through said bar means into contact with said pressure vessel and where one of the aligned holes in at least one of said second ends and bar means ends is a slot at an angle such that as said screw is forced against said vessel the pin engaging said slot drives that second end toward said vessel.

5. The apparatus according to claim 1 wherein said actuator means includes at least one hydraulic cylinder secured to said second ends, adapted to move said second ends toward or away from each other when said bar means is removed.

6. The apparatus according to claim 1 wherein said hinge means is mounted on a bracket on a support member with said second ends in a substantially vertical orientation whereby when said frames are in the open position a pressure vessel may be introduced into said cavity vertically from above.

7. An apparatus for diffusion bonding and/or superplastic forming of assemblies of metal components which comprises:
   at least one pair of opposed generally L-shaped frames;
   a hinge means interconnecting first ends of pairs of said frames to form generally U-shaped frame assemblies with the second ends of said frames movable toward each other to a closed position and away from each other to an open position;
   said frames defining a cavity therebetween in said closed position adapted to contain a pressure vessel;
   said pressure vessel including a plurality of forming members having an interior volume for holding parts to be formed and/or bonded, an exterior wall configured to abut the interior walls of said cavity, means for heating said interior volume to the forming and/or bonding temperature of said parts and means to introduce gas under pressure into said volume;
   actuator means for moving said second ends between said open position and said closed position; and
   connection means for connecting said second ends and to exert a clamping pressure on a pressure vessel in said cavity in said closed position.

8. The apparatus according to claim 7 wherein said actuator means includes at least one hydraulic cylinder adapted to move said frames between said open and closed positions.

9. The apparatus according to claim 7 wherein said frames are mounted on a support plate with said second ends in a substantially vertical orientation, whereby when said frames are in the open position a pressure vessel may be introduced into said cavity vertically from above.

10. The apparatus according to claim 7 wherein said pressure vessel further includes a cooling liquid jacket and conduit through said pressure vessel for introducing cooling liquid into said jacket and removing liquid therefrom.

11. The apparatus according to claim 7 wherein said forming members include at least two cast ceramic components having heating elements embedded therein.

12. The apparatus according to claim 7 wherein a plurality of said pairs of frames are arranged in series with said second ends interconnected to move together, whereby an elongated pressure vessel may be clamped.

13. The apparatus according to claim 7 wherein said connection means includes a bar connected to said second ends by pins which extend through aligned holes in said second ends and the ends of said bar.

14. The apparatus according to claim 13 wherein said connection means further includes means for driving said second ends together comprising a screw means having a screw extending through said bar into contact with a pressure vessel in said cavity and where one of the aligned holes in at least one of said second ends and bar means ends is a slot at an angle such that as said screw is forced against said vessel the pin engaging said slot drives that second end toward said vessel.

15. The apparatus according to claim 7 wherein said hinge means is mounted on a bracket on a support member with said second ends in a substantially vertical orientation whereby when said frames are in the open position a pressure vessel may be introduced into said cavity vertically from above.

16. The method of clamping a bonding and forming assembly into a unitary structure during bonding and forming operations which comprises the steps of:
   providing a pair of generally L-shaped opposed frames having cooperating internal faces configured to provide a cavity therebetween;
   interconnecting at least one pair of first ends with a hinge means which permits said second, opposite, pair of ends to be moved together to a closed position and apart to an open position;

inserting into said cavity a pressure vessel having an exterior configuration corresponding to that of said cavity;

moving said frames together into a closed, clamping relationship with opposite surfaces of said pressure vessel;

locking said second ends of said frames together;

operating said pressure vessel to produce the desired bonding and/or shaping operations;

unlocking said second ends of said frames;

moving said second ends apart to said open position; and removing said pressure vessel from said cavity.

17. The method according to claim 16 wherein said opening and closing operations are conducted by extending and retracting at least one hydraulic cylinder secured to the adjacent second edges of said frames.

18. The method according to claim 16 wherein said locking and unlocking is accomplished by connecting and disconnecting a bar extending between said second ends.

19. The method according to claim 16 wherein said pressure vessel operation includes introducing a pressurized gas into said pressure vessel and heating the interior of said pressure vessel to a temperature sufficient to produce the desired bonding and/or shaping operations.

20. The method according to claim 19 further including the step of, upon completion of the bonding and/or shaping operation, introducing a cooling fluid into a cooling jacket provided near the outer surface of said pressure vessel.

* * * * *

UNITED STATES PATENT AND TRADEMARK OFFICE
CERTIFICATE OF CORRECTION

PATENT NO. : 5,002,219
DATED : March 26, 1991
INVENTOR(S) : Gilbert C. Cadwell

It is certified that error appears in the above—identified patent and that said Letters Patent is hereby corrected as shown below:

On the title page, item [73],
Change the assignee from "The United States of America as represented by the Secretary of the Navy, Washington, D.C."

to -- ROHR INDUSTRIES, INC., Chula Vista, CA

On the title page, Attorney, Agent, or Firm, "Harvey Fedelman; Thomas G. Keough; Peter A. Lipovsky" should be changed to --Patrick J. Schlesinger and Frank D. Gilliam--.

Signed and Sealed this

Twenty-fifth Day of August, 1992

*Attest:*

DOUGLAS B. COMER

*Attesting Officer*  *Acting Commissioner of Patents and Trademarks*